US012628993B2

(12) United States Patent
Ye

(10) Patent No.: US 12,628,993 B2
(45) Date of Patent: May 19, 2026

(54) DUAL-PURPOSE BLOWING-SUCTION MACHINE

(71) Applicant: Ningbo Brightech international trading co., ltd, Yuyao City (CN)

(72) Inventor: Jun Ye, Yuyao City (CN)

(73) Assignee: NINGBO BRIGHTECH INTERNATIONAL TRADING CO., LTD, Yuyao City (CN)

( * ) Notice: Subject to any disclaimer, the term of this patent is extended or adjusted under 35 U.S.C. 154(b) by 400 days.

(21) Appl. No.: 18/554,987

(22) PCT Filed: May 5, 2022

(86) PCT No.: PCT/CN2022/090908
§ 371 (c)(1),
(2) Date: Oct. 11, 2023

(87) PCT Pub. No.: WO2022/257652
PCT Pub. Date: Dec. 15, 2022

(65) Prior Publication Data
US 2024/0122419 A1 Apr. 18, 2024

(30) Foreign Application Priority Data
Jun. 9, 2021 (CN) .......................... 202121281140.2

(51) Int. Cl.
*A47L 5/14* (2006.01)
*A01K 13/00* (2006.01)
(Continued)

(52) U.S. Cl.
CPC .............. *A47L 5/14* (2013.01); *A01K 13/001* (2013.01); *A47L 7/0066* (2013.01); *A47L 9/08* (2013.01)

(58) Field of Classification Search
CPC . A47L 5/14; A47L 9/1683; A47L 9/04; A47L 9/08; A01K 13/001
See application file for complete search history.

(56) References Cited

U.S. PATENT DOCUMENTS 6,141,823 A * 11/2000 Fujiwara ................... B08B 5/04
15/330
2002/0108205 A1* 8/2002 Berfield .................. A47L 5/365
15/328
(Continued)

FOREIGN PATENT DOCUMENTS

CN 2245952 Y 1/1997
CN 202739914 U 2/2013
(Continued)

OTHER PUBLICATIONS

International search report from the the PCT application No. PCT/CN2022/090908 issued Jul. 15, 2022 and English translation provided by WIPO.
(Continued)

*Primary Examiner* — Michael D Jennings
(74) *Attorney, Agent, or Firm* — Ladas & Parry, LLP

(57) ABSTRACT

A dual-purpose blowing-suction machine includes a casing, an air suction opening, an air blowing opening, a dust barrel, an air duct, and a motor. The dust barrel is in communication with the air suction opening, and the motor is provided with an air inlet hole in communication with the air duct and an air outlet cavity in communication with the air blowing opening. The dual-purpose blowing-suction machine provides an inner cavity in the casing, and the casing is provided
(Continued)

with an air inlet in communication with the inner cavity; and a front through hole is provided between the dust barrel and the air duct, a rear through hole is provided between the air duct and the inner cavity, and a baffle that switches opening and closing of the front through hole and the rear through hole is arranged in the air duct.

8 Claims, 4 Drawing Sheets

(51) Int. Cl.
    *A47L 7/00*          (2006.01)
    *A47L 9/08*          (2006.01)

(56)                References Cited

U.S. PATENT DOCUMENTS

| | | | | |
|---|---|---|---|---|
| 2006/0162116 A1* | 7/2006 | Andresen | .............. | E01H 1/0809 |
| | | | | 15/327.5 |
| 2006/0213025 A1* | 9/2006 | Sawalski | ................... | A47L 5/14 |
| | | | | 15/346 |

| | | | | |
|---|---|---|---|---|
| 2008/0127448 A1* | 6/2008 | Kremsler | .................. | A47L 5/24 |
| | | | | 15/330 |
| 2016/0324380 A1 | 11/2016 | Sergyeyenko et al. | | |
| 2018/0310786 A1* | 11/2018 | Zhong | ....................... | A47L 5/26 |

FOREIGN PATENT DOCUMENTS

| | | | |
|---|---|---|---|
| CN | 103536248 A | 1/2014 |
| CN | 104367265 A | 2/2015 |
| CN | 206138053 U | 5/2017 |
| CN | 107708405 A | 2/2018 |
| CN | 108606715 A | 10/2018 |
| CN | 208876386 U | 5/2019 |
| CN | 211130857 U | 7/2020 |
| CN | 215605374 U | 1/2022 |
| JP | 2010268960 A | 12/2010 |
| WO | 2022257652 A1 | 12/2022 |

OTHER PUBLICATIONS

PCT written opinion from the the PCT application No. PCT/CN2022/090908 issued Jul. 15, 2022 and machine English translation provided by WIPO.

* cited by examiner

DUAL-PURPOSE BLOWING-SUCTION MACHINE

CROSS-REFERENCE TO RELATED APPLICATIONS

This disclosure is the U.S. national phase application of PCT Application No. PCT/CN2022/090908 filed on May 5, 2022, which claims priority to Chinese Patent Application No. 202121281140.2 filed on Jun. 9, 2021, the disclosures of which are incorporated herein by reference in their entireties.

TECHNICAL FIELD

The disclosure relates to a household appliance, and specifically, to a dual-purpose blowing-suction machine.

BACKGROUND

At present, among household appliances, the vacuum cleaner only has a vacuuming function, and the blower only has an air blowing function. Although there is an air outlet on the vacuum cleaner that can be used for air blowing, the air blowing is mainly generated after an air suction opening sucks air mixed with impurities such as garbage and dust and the air enters a dust barrel. There are usually some fine dust particles and odor in the air blowing, and apparently, this cannot be used for normal air blowing. However, some users expect that manufacturers can provide a household appliance with both the vacuuming function and the air blowing function. For example, after a pet takes a bath at home, a vacuum cleaner is often needed to clean the dust and hair on the ground, and the pet hair needs to be blow-dried. In this case, the user needs to prepare both a vacuum cleaner and a blower, which is quite troublesome. Certainly, not only for pet hair blow-drying, in some cases, household appliances with a blowing-suction dual-purpose function are indeed needed to meet special needs of users.

SUMMARY

A technical problem to be resolved by the disclosure is to overcome defects in the prior art and provide a dual-purpose blowing-suction machine having both a vacuuming function of a vacuum cleaner and an air blowing function of a blower.

The technical problem of the disclosure is resolved by the following technical solutions:

A dual-purpose blowing-suction machine is provided, including a casing, an air suction opening and an air blowing opening that are provided on the casing, and a dust barrel, an air duct, and a motor that are provided in the casing, where the dust barrel is in communication with the air suction opening, and the motor is provided with an air inlet hole in communication with the air duct and an air outlet cavity in communication with the air blowing opening, where an inner cavity is provided in the casing, and the casing is provided with an air inlet in communication with the inner cavity; a front through hole for communication is provided between the dust barrel and the air duct, a rear through hole for communication is provided between the air duct and the inner cavity, and a baffle that switches opening and closing of the front through hole and the rear through hole is arranged in the air duct; the baffle closes the rear through hole and opens the front through hole, and after air enters the dust barrel from the air suction opening and is filtered, the air sequentially passes through the front through hole, the air duct, the air inlet hole, and the air outlet cavity, and then is blown out from the air blowing opening; and the baffle closes the front through hole and opens the rear through hole, and air enters the inner cavity from the air inlet, sequentially passes through the rear through hole, the air duct, the air inlet hole, and the air outlet cavity, and then is blown out from the air blowing opening.

The baffle swings toward the rear through hole to close the rear through hole and open the front through hole; and the baffle swings toward the front through hole to close the front through hole and open the rear through hole.

A connecting rod is arranged in the casing, a front end of the connecting rod is hinged to the baffle, and the connecting rod performs axial back-and-forth reciprocating movement, and drives the baffle to swing back and forth to switch opening and closing of the front through hole and the rear through hole.

An elastic element is arranged in the casing, the elastic element elastically pushes the connecting rod and drives the connecting rod to move backward to drive the baffle to swing toward the rear through hole, and the baffle closes the rear through hole and opens the front through hole.

A guide groove and a guide block that are slidably assembled are respectively provided between the connecting rod and the casing, and the guide groove and the guide block form guide for the axial back-and-forth reciprocating movement of the connecting rod.

A HEPA filter is arranged in the dust barrel, and the HEPA filter filters air entering the front through hole from the dust barrel.

The air suction opening is provided at a front end of the casing, the air blowing opening is provided at a rear end of the casing, and the air inlet is provided on a side wall of the casing.

A dust cover that detachably covers and closes the dust barrel is arranged at a front end of the casing.

Compared with the prior art, in the disclosure, it is mainly to add an inner cavity in the casing, and the casing is provided with an air inlet in communication with the inner cavity; and a front through hole is provided between the dust barrel and the air duct, a rear through hole is provided between the air duct and the inner cavity, and a baffle that switches opening and closing of the front through hole and the rear through hole is arranged in the air duct. In this way, when the baffle closes the rear through hole and opens the front through hole, after air enters the dust barrel from the air suction opening and is filtered, the air sequentially passes through the front through hole, the air duct, the air inlet hole, and the air outlet cavity, and then is blown out from the air blowing opening, thereby implementing a vacuuming function of a vacuum cleaner; and when the baffle closes the front through hole and opens the rear through hole, air may enter the inner cavity from the air inlet, sequentially pass through the rear through hole, the air duct, the air inlet hole, and the air outlet cavity, and then be blown out from the air blowing opening, thereby implementing an air blowing function of a blower. Apparently, because opening and closing of the air inletting during vacuuming and the air inletting during air blowing can be switched through the baffle, that is, the two air inletting routes are completely different and do not interfere with each other, both the vacuuming function and the air blowing function can be implemented independently, which makes a household appliance have blowing-suction dual-purpose use characteristics, thereby fully meeting special needs of users.

DETAILED DESCRIPTION

Figure 1:
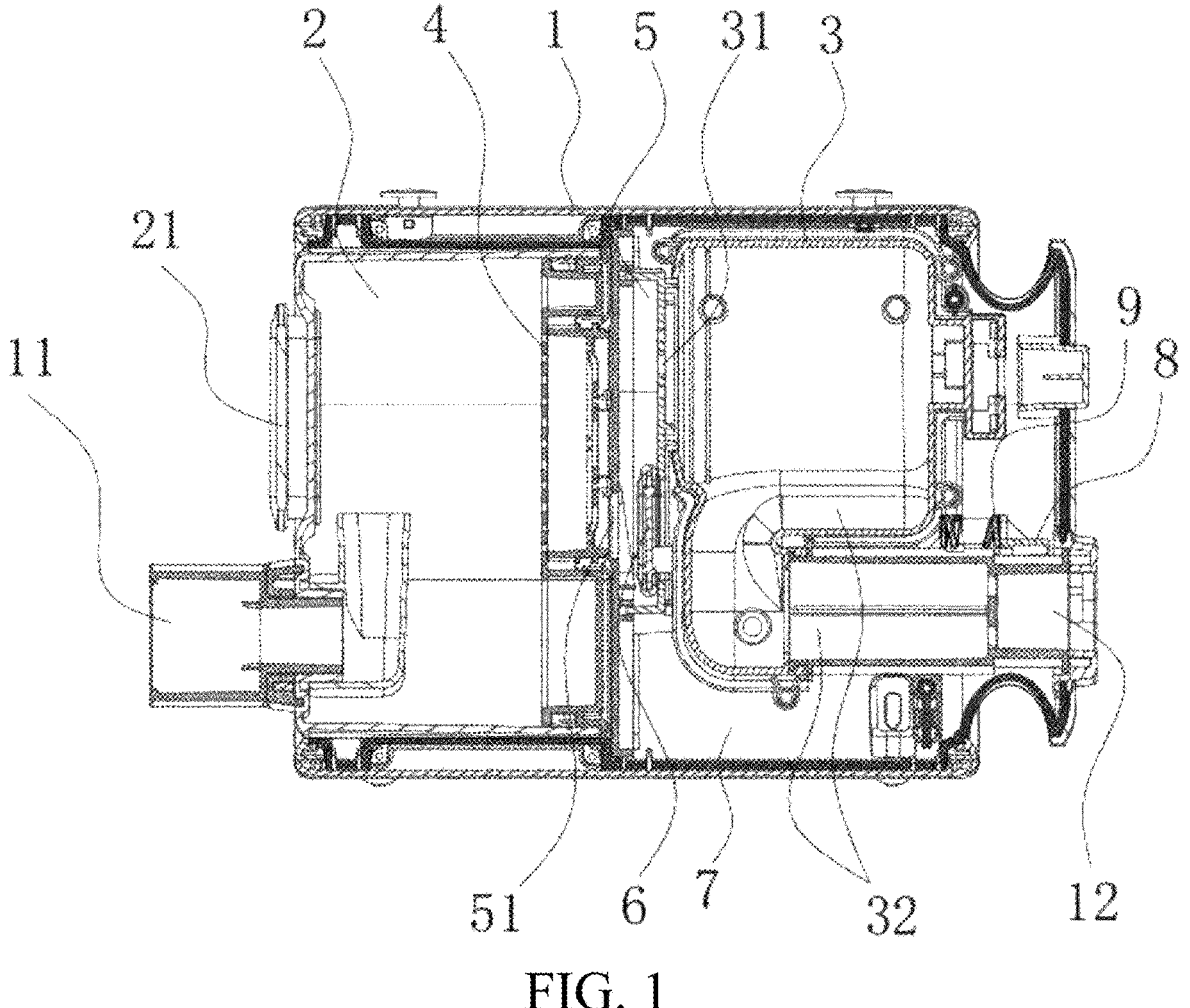
FIG. 1 is a schematic cross-sectional structural diagram of the disclosure (a baffle closes a rear through hole and opens a front through hole).

The embodiments of the disclosure are further described in detail below with reference to the foregoing accompanying drawings.

As shown in FIG. 1 to FIG. 4, reference numerals are as follows: 1. casing; 11. air suction opening; 12. air blowing opening; 13. air inlet; 2. dust barrel; 21. dust cover; 3. motor; 31. air inlet hole; 32. air outlet cavity; 4. HEPA filter; 5. air duct; 51. front through hole; 52. rear through hole; 6. baffle; 7. inner cavity; 8. connecting rod; 81. guide block; 82. guide groove; 83. drive block; 9. elastic member.

Figure 2:
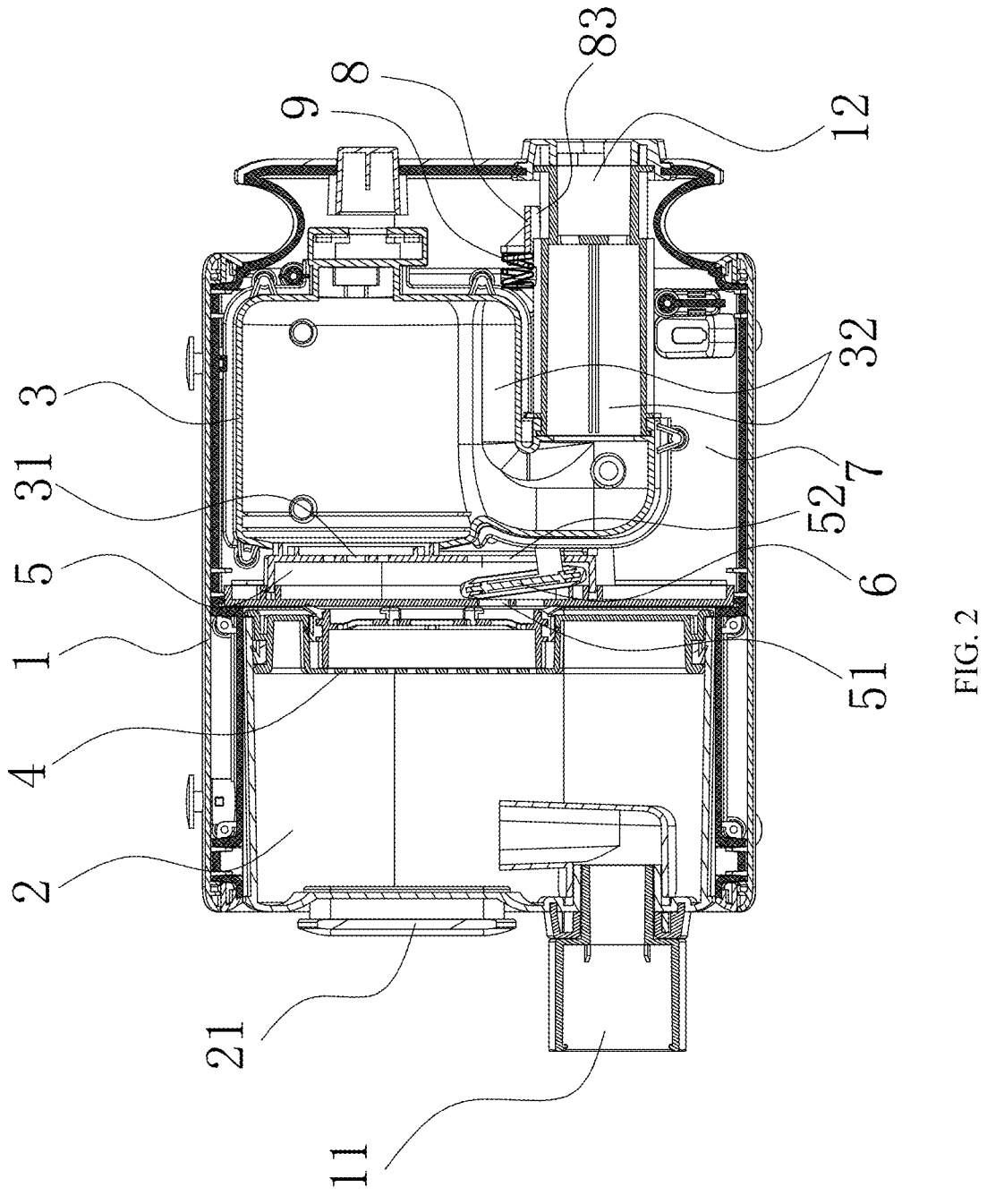
FIG. 2 is a schematic cross-sectional structural diagram of the disclosure (a baffle closes a front through hole and opens a rear through hole).
Figure 3:
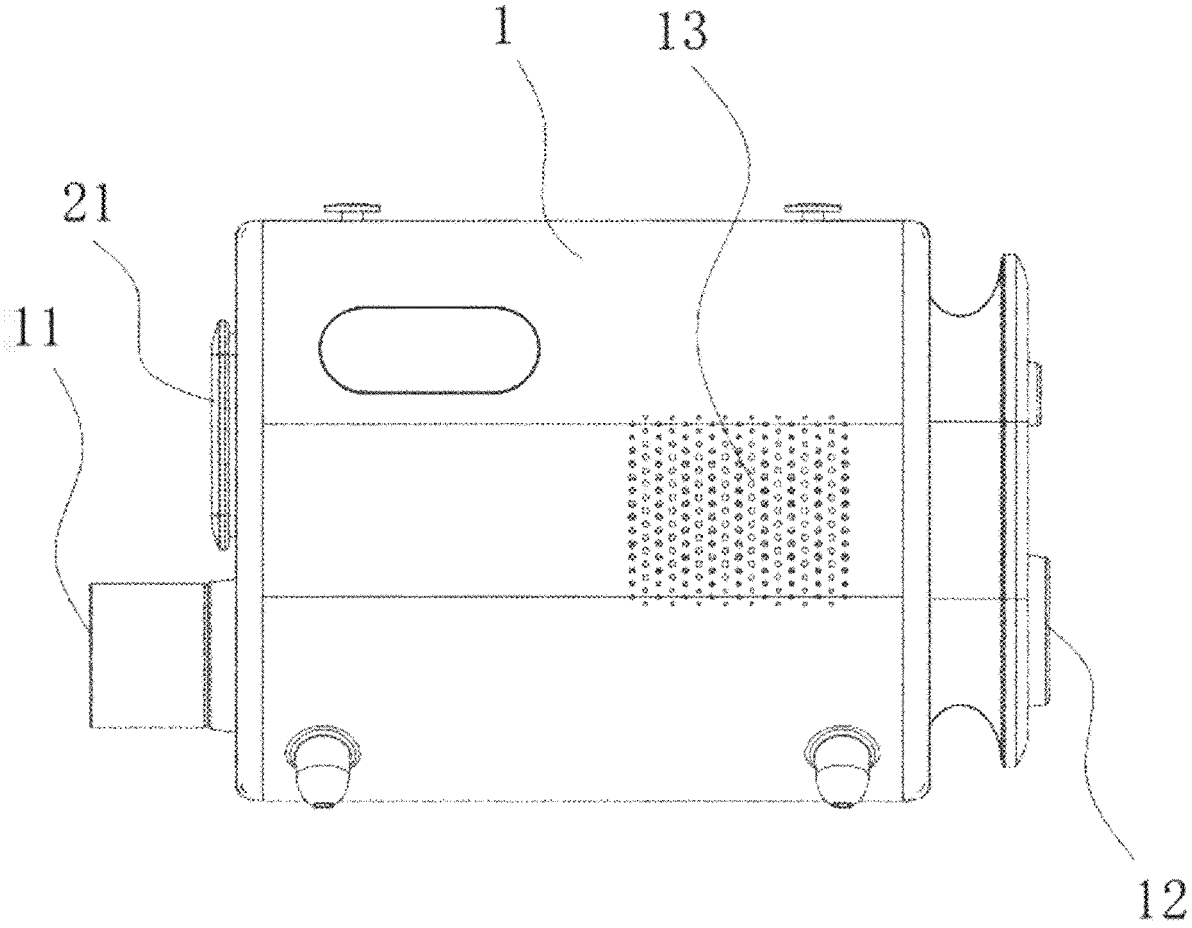
FIG. 3 is a lateral view of FIG. 1.
Figure 4:
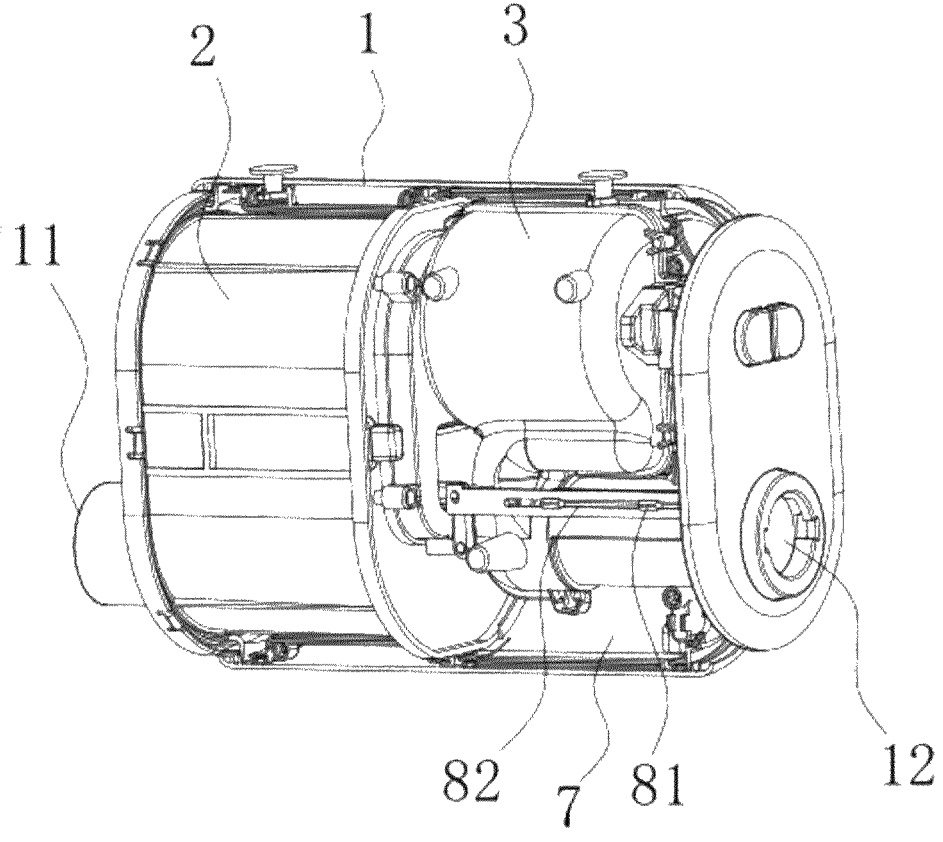
FIG. 4 is a three-dimensional view of FIG. 1 with half of a casing removed.

A dual-purpose blowing-suction machine is provided. As shown in FIG. 1 and FIG. 2, the dual-purpose blowing-suction machine has both a vacuuming function of a vacuum cleaner and an air blowing function of a blower, and the structure thereof mainly includes a casing 1, an air suction opening 11, an air blowing opening 12, and an air inlet 13 that are provided on the casing, and a dust barrel 2, an air duct 5, a motor 3, and an inner cavity 7 that are provided in the casing 1.

In this embodiment, the left side of the view shown in FIG. 1 is used as a front end of the blowing-suction machine and the right side of the view is used as a rear end of the blowing-suction machine. The air suction opening 11 is provided at the front end of the casing 1, the air blowing opening 12 is provided at the rear end of the casing 1, and the air inlet 13 is provided on the side wall of the casing 1; the dust barrel 2 is arranged at a front portion of the casing 1 and in communication with the air suction opening 11, and a dust cover 21 that detachably covers and closes the dust barrel 2 is arranged at the front end of the casing 1 to facilitate garbage cleaning in the dust barrel 2; the motor 3 is arranged at a rear portion of the casing 1; the air duct 5 is provided between the dust barrel 2 and the motor 3; and the inner cavity 7 is provided around an outer circumference of the motor 3 and in communication with the outside through the air inlet 13.

The motor 3 is provided with an air inlet hole 31 in communication with the air duct 5 and an air outlet cavity 32 in communication with the air blowing opening 12; and a front through hole 51 is provided between the dust barrel 2 and the air duct 5 for communication, and a rear through hole 52 is provided between the air duct 5 and the inner cavity 7 for communication, so that a HEPA filter 4 further needs to be arranged in the dust barrel 2, where the HEPA filter 4 can filter air entering the front through hole 51 from the dust barrel 2.

A baffle 6 that switches opening and closing of the front through hole and the rear through hole is arranged in the air duct 5. The specific structure is: the baffle 6 has a structure with a single-point-hinged lower end and a freely-opened-and-closed upper end, so that the baffle 6 can swing back and forth around a hinge point; and a horizontally mounted connecting rod 8 is arranged in the casing 1, where a front end of the connecting rod 8 is hinged to a middle portion of the baffle 6, a drive block 83 extending into the air blowing opening 12 is arranged at a rear end of the connecting rod 8, and the connecting rod 8 can perform axial back-and-forth reciprocating movement, so that a guide groove 82 and a guide block 81 that are slidably assembled are respectively provided between the connecting rod 8 and the casing 1, to ensure guide for the connecting rod 8 perform the axial back-and-forth reciprocating movement.

In addition, an elastic element 9 is arranged in the casing 1, and the elastic element 9 elastically pushes the connecting rod 8 backward. Therefore, under normal conditions, the elastic pushing of the elastic element makes the connecting rod 8 always maintain the tendency of axially moving backward, and the axial backward movement of the connecting rod 8 drives the baffle 6 connected to the front end to swing around the hinge point to the rear through hole 52, so as to close the rear through hole 52 and open the front through hole 51.

Certainly, if a hose (not shown in the figure) is inserted into the air blowing opening 12, the hose will push the drive block 83 to overcome the pushing elastic force of the elastic element 9 and drive the connecting rod 8 to move axially forward, and then drive the baffle 6 connected to the front end of the connecting rod 8 to swing around the hinge point to the front through hole 51, so as to close the front through hole and open the rear through hole 52. In this way, through the axial back-and-forth reciprocating movement of the connecting rod 8, the baffle 6 can be driven to swing back and forth around the hinge point to switch opening and closing of the front through hole and the rear through hole.

In addition, after the baffle 6 closes the rear through hole 52 and opens the front through hole 51, the motor 3 is started, and air may enter the dust barrel 2 from the air suction opening 11, be filtered by the HEPA filter 4, and then sequentially pass through the front through hole 51, the air duct 5, the air inlet hole 31, and the air outlet cavity 32, and finally be blown out from the air blowing opening 12. This working process is usually the vacuuming function of the vacuum cleaner. After the baffle 6 closes the front through hole 51 and opens the rear through hole 52, the motor 3 is started, and air may enter the inner cavity 7 from the air inlet 13, and sequentially pass through the rear through hole 52, the air duct 5, the air inlet hole 31, and the air outlet cavity 32, and finally be blow out from the air blowing opening 12. This working process is usually the air blowing function of the blower.

It should be noted that under normal conditions, the entire blowing-suction machine is maintained at the vacuuming function, that is, the baffle closes the rear through hole 52 and opens the front through hole 51. Only when the air blowing function is used, the hose is inserted into the air blowing opening 12 to drive the baffle 6 to switch to air blowing connection. That is, when it is necessarily use the hose to lengthen the air blowing opening 12 in the air blowing process, the blowing-suction machine simultaneously needs to be switched to the use function of the blower.

Apparently, because opening and closing of the air inletting during vacuuming and the air inletting during air blowing can be switched through the baffle 6, that is, the two air inletting routes are completely different and do not interfere with each other, both the vacuuming function and the air blowing function can be implemented independently, which makes a household appliance have blowing-suction dual-purpose use characteristics, thereby fully meeting special needs of users.

The disclosure is applicable to vacuuming and cleaning of dust and hair on the ground after a pet takes a bath at home, and can also blow-dry the pet hair. Certainly, this dual-purpose blowing-suction machine can be used in all situations in which both the vacuuming function and the air blowing function are required.

The foregoing descriptions are merely specific embodiments of the disclosure, and a person skilled in the art should understand that any structural design similar to the embodiments shall fall within the protection scope of the disclosure.

What is claimed is:

1. A dual-purpose blowing-suction machine, comprising a casing, an air suction opening and an air blowing opening that are provided on the casing, and a dust barrel, an air duct, and a motor that are provided in the casing, wherein the dust barrel is in communication with the air suction opening, and the motor is provided with an air inlet hole in communication with the air duct and an air outlet cavity in communication with the air blowing opening, wherein an inner cavity is provided in the casing, and the casing is provided with an air inlet in communication with the inner cavity; a front through hole for communication is provided between the dust barrel and the air duct, a rear through hole for communication is provided between the air duct and the inner cavity, and a baffle that switches opening and closing of the front through hole and the rear through hole is arranged in the air duct; the baffle closes the rear through hole and opens the front through hole, and after air enters the dust barrel from the air suction opening and is filtered, the air sequentially passes through the front through hole, the air duct, the air inlet hole, and the air outlet cavity, and then is blown out from the air blowing opening; and the baffle closes the front through hole and opens the rear through hole, and air enters the inner cavity from the air inlet, sequentially passes through the rear through hole, the air duct, the air inlet hole, and the air outlet cavity, and then is blown out from the air blowing opening.

2. The dual-purpose blowing-suction machine according to claim 1, wherein the baffle swings toward the rear through hole to close the rear through hole and open the front through hole; and the baffle swings toward the front through hole to close the front through hole and open the rear through hole.

3. The dual-purpose blowing-suction machine according to claim 2, wherein a connecting rod is arranged in the casing, a front end of the connecting rod is hinged to the baffle, and the connecting rod performs axial back-and-forth reciprocating movement, and drives the baffle to swing back and forth to switch opening and closing of the front through hole and the rear through hole.

4. The dual-purpose blowing-suction machine according to claim 3, wherein an elastic element is arranged in the casing, the elastic element elastically pushes the connecting rod and drives the connecting rod to move backward to drive the baffle to swing toward the rear through hole, and the baffle closes the rear through hole and opens the front through hole.

5. The dual-purpose blowing-suction machine according to claim 3, wherein a guide groove and a guide block that are slidably assembled are respectively provided between the connecting rod and the casing, and the guide groove and the guide block form guide for the axial back-and-forth reciprocating movement of the connecting rod.

6. The dual-purpose blowing-suction machine according to claim 1, wherein a HEPA filter is arranged in the dust barrel, and the HEPA filter filters air entering the front through hole from the dust barrel.

7. The dual-purpose blowing-suction machine according to claim 1, wherein the air suction opening is provided at a front end of the casing, the air blowing opening is provided at a rear end of the casing, and the air inlet is provided on a side wall of the casing.

8. The dual-purpose blowing-suction machine according to claim 1, wherein a dust cover that detachably covers and closes the dust barrel is arranged at a front end of the casing.

* * * * *